United States Patent
Shih et al.

(10) Patent No.: US 7,816,965 B2
(45) Date of Patent: Oct. 19, 2010

(54) COOPERATION CIRCUIT

(75) Inventors: Fu-Yang Shih, Hsinchu (TW);
Ken-Tang Wu, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 99 days.

(21) Appl. No.: 12/327,009

(22) Filed: Dec. 3, 2008

(65) Prior Publication Data

US 2010/0052757 A1 Mar. 4, 2010

(30) Foreign Application Priority Data

Aug. 27, 2008 (TW) .............................. 97132691 A (51) Int. Cl.
*H03H 11/16* (2006.01)
(52) U.S. Cl. ..................... 327/232; 327/155; 327/164
(58) Field of Classification Search .......... 327/231–237
See application file for complete search history.

(56) References Cited

U.S. PATENT DOCUMENTS

| | | | | |
|---|---|---|---|---|
| 6,020,773 A * | 2/2000 | Kan et al. | ................... | 327/271 |
| 6,031,425 A * | 2/2000 | Hasegawa | ................... | 331/1 A |
| 6,466,065 B1 * | 10/2002 | Takekawa | ................... | 327/115 |
| 6,744,296 B1 * | 6/2004 | Chen et al. | ................... | 327/231 |
| 7,053,687 B1 * | 5/2006 | Nguyen | ...................... | 327/231 |
| 7,453,301 B1 * | 11/2008 | Kaviani | ....................... | 327/231 |
| 7,668,022 B2 * | 2/2010 | Goller | ................... | 365/189.05 |
| 2005/0218956 A1 * | 10/2005 | LaBerge | ..................... | 327/291 |
| 2006/0028251 A1 * | 2/2006 | Leifso et al. | ................. | 327/117 |
| 2007/0002641 A1 * | 1/2007 | Kim et al. | .............. | 365/189.12 |

* cited by examiner

*Primary Examiner*—Lincoln Donovan
*Assistant Examiner*—Ryan C Jager
(74) *Attorney, Agent, or Firm*—WPAT, PC; Justin King (57) ABSTRACT

The present invention discloses a cooperation circuit, comprising: a first control module, capable of generating a first control signal and a second control signal, the pulse width of the first control signal being determined by the pulse width of the second control signal; and a second control module, coupled to the first control module to receive the first control signal and the second control signal and generate a third control signal according to the first control signal and the second control signal; wherein, according to the first control signal and the second control signal, the second control module enables the third control signal and the second control signal to exhibit the same frequency and the same duty cycle with a phase delay.

14 Claims, 6 Drawing Sheets

COOPERATION CIRCUIT

BACKGROUND OF THE INVENTION

1. Field of the Invention

The present invention generally relates to a cooperation circuit and, more particularly, to a cooperation circuit with a phase delay between the phase of the present-stage control signal and the phase of previous-stage control signal.

2. Description of the Prior Art

The cooperation circuit, currently used in large-current control, is generally controlled by internal switches with serial peripheral interface (SPI) bus, I2C bus, SM bus or PM bus, which results in drawbacks as follows:

1. External setting of addressing is required for I2C bus, SM bus or PM bus. The clock frequency is too low (less than 400 kHz) for high-frequency switching. For example, the clock frequency is required to be 60 MHz for 500-kHz pulse width modulation (PWM) with 7-bit resolution.

2. Even though the SPI bus is capable of using ring topology without external addressing, the aforementioned low clock frequency cannot match with the operation. Moreover, high clock frequency operation consumes much power and induces EMI and noise.

3. If the master needs to send the setting data such as duty, resolution, or phase shift . . . etc to the slave, the slaves should have internal osc/clock to count the duty, which adds the cost and power consumption. If external clock is used, it may result in high power consumption and EM interference. And even worse, if the clock frequency of each IC is different, the PWM frequency of each IC is different.

Therefore, there exists a need in providing a cooperation circuit without additional addressing that is capable of achieving low power consumption, low EMI and identical PWM frequency.

SUMMARY OF THE INVENTION

It is one object of the present invention to provide a cooperation circuit capable of achieving small power ripples, low EMI and identical PWM frequency between modules with phase delays.

In order to achieve the foregoing object, in one embodiment, the present invention provides a cooperation circuit, comprising: a first control module, capable of generating a first control signal and a second control signal, the frequency and the pulse width of the first control signal being determined by the frequency and the pulse width of the second control signal; and a second control module, coupled to the first control module to receive the first control signal and the second control signal and generate a third control signal according to the first control signal and the second control signal; wherein the second control module causes a phase delay between the phase of the third control signal and the phase of the second control signal according to the first control signal and the second control signal.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by the preferred embodiments as described hereinafter.

Figure 1:
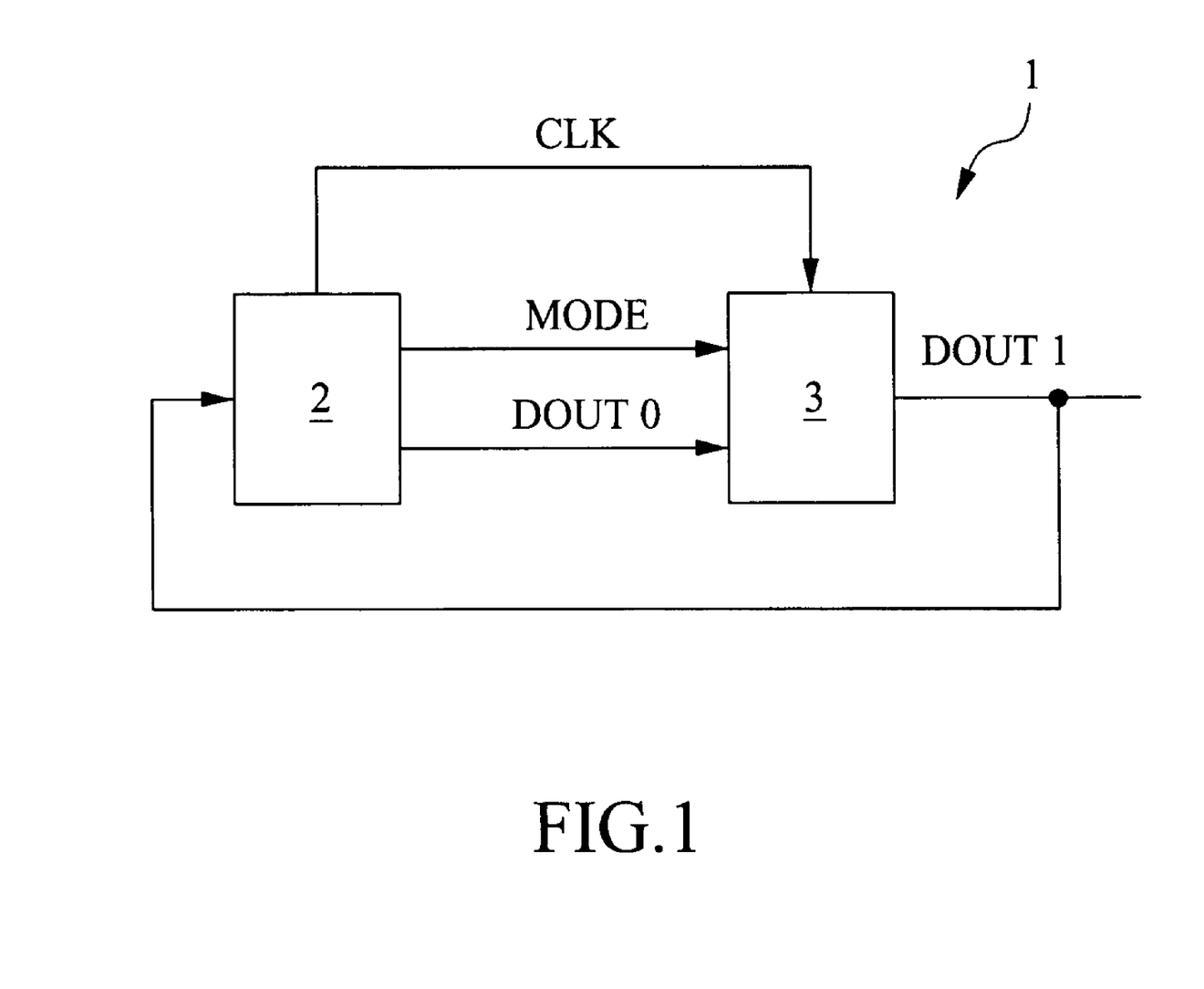
FIG. 1 is a systematic diagram of a cooperation circuit according to the preferred embodiment of the present invention.

FIG. 1 is a systematic diagram of a cooperation circuit according to the preferred embodiment of the present invention. Referring to FIG. 1, the cooperation circuit 1 of the present invention comprises: a first control module 2 and a second control module 3. The first control module 2 is capable of generating a first control signal CLK and a second control signal DOUT0. The pulse width of the first control signal CLK is determined by the pulse width of the second control signal DOUT0 and the number of the cooperation circuit modules. The second control module 3 is coupled to the first control module 2 to receive the first control signal CLK and the second control signal DOUT0 and generate a third control signal DOUT1 according to the first control signal CLK and the second control signal DOUT0. The second control module 3 causes a phase delay between the phase of the third control signal DOUT0 and the phase of the second control signal DOUT0 according to the first control signal CLK and the second control signal DOUT0. The frequency and the duty cycle of the third control signal DOUT1 are the same as the frequency and the duty cycle of the second control signal DOUT0.

In one embodiment, according to the user's need, the third control signal DOUT1 is fed back to the first control module 2. In another embodiment, the first control module 2 generates a fourth control signal MODE. When the fourth control signal MODE is at one state, the first control module 2 sends the first control signal CLK and the second control signal DOUT0 to the second control module 3 and determines the number of the second control module 3 according to the third control signal DOUT1 from the second control module 3 to the first control module 2. When the fourth control signal MODE is at the state, the first control module 2 sends the first control signal CLK and the second control signal DOUT0 to the second control module 3 to enable the second control module 3. When the fourth control signal MODE is at another state, the second control module 3 causes a phase delay between the phase of the third control signal DOUT1 and the phase of the second control signal DOUT0 according to the first control signal CLK and the second control signal DOUT0. For the calculation of the frequency and the pulse width, the frequency of the first control signal CLK preferably equals to the frequency of the second control signal DOUT0 multiplied by the number of the first control module 2 and enabled second control modules 3. The pulse width of the first control signal CLK preferably equals to the remainder of the pulse width of the second control signal DOUT0 divided by the cycle of the first control signal CLK.

For the triggering of the first control module 2 and second control module 3, it is preferable that the third control signal DOUT1 is high when the first control signal CLK is rising edge triggered for a next time after the second control signal DOUT0 is rising edge triggered to be high; otherwise, the third control signal DOUT1 is high when the first control signal CLK is rising edge triggered for a next time after the first control signal CLK is falling edge triggered and the second control signal DOUT0 is high. The third control signal DOUT1 is low when the first control signal CLK is falling edge triggered for a next time after the second control signal DOUT0 is falling edge triggered to be low; otherwise, the third control signal DOUT1 is low when the first control signal CLK is falling edge triggered for a next time after the first control signal CLK is falling edge triggered and the second control signal DOUT0 is low. The duty cycle of a control module is defined between the timing the second control signal DOUT0 (or the third control signal DOUT1) is rising edge triggered to be high and the timing the second control signal DOUT0 (or the third control signal DOUT1) is falling edge triggered to be low. Detailed trigger waveform will be described with plural third control modules hereinafter.

Figure 2:
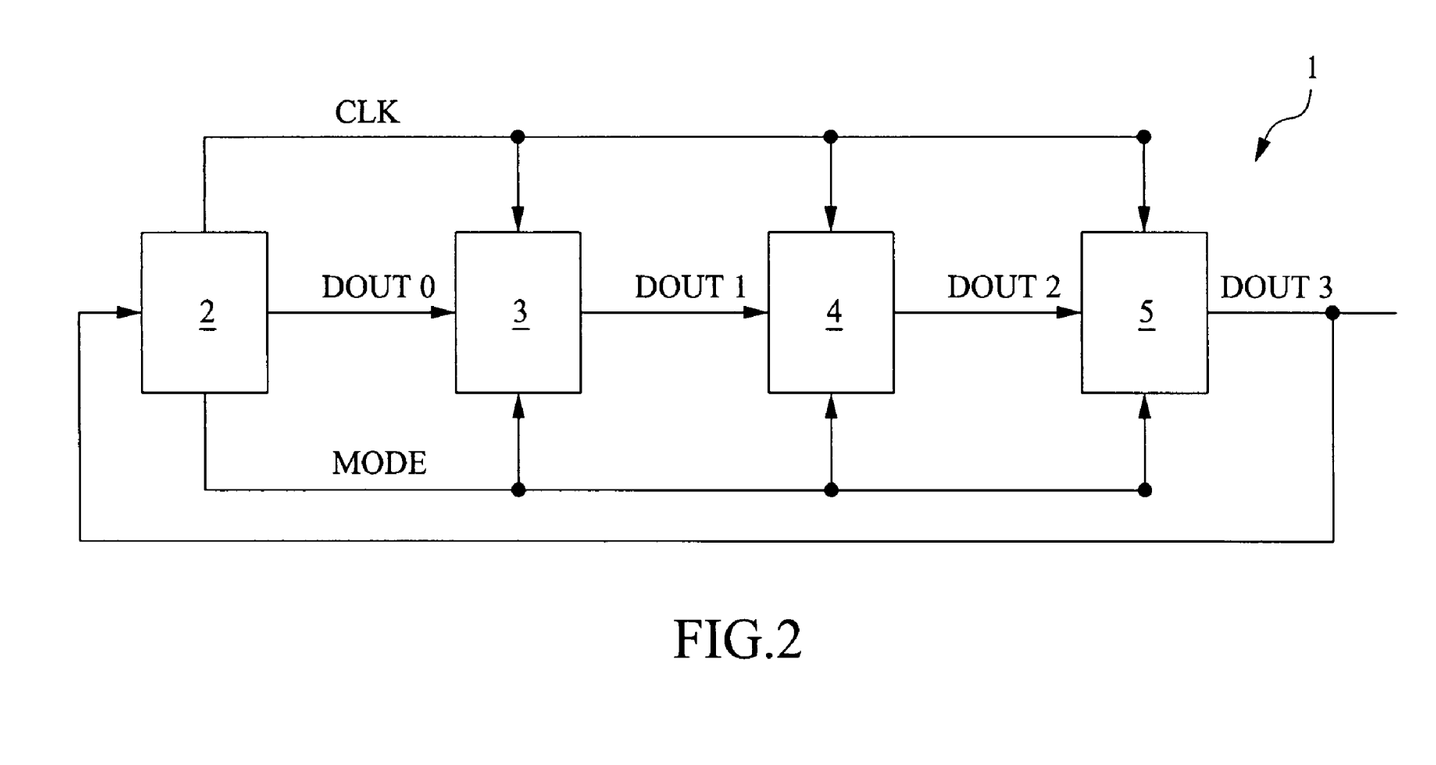
FIG. 2 is a systematic diagram of a cooperation circuit according to another embodiment of the present invention.
Figure 3:
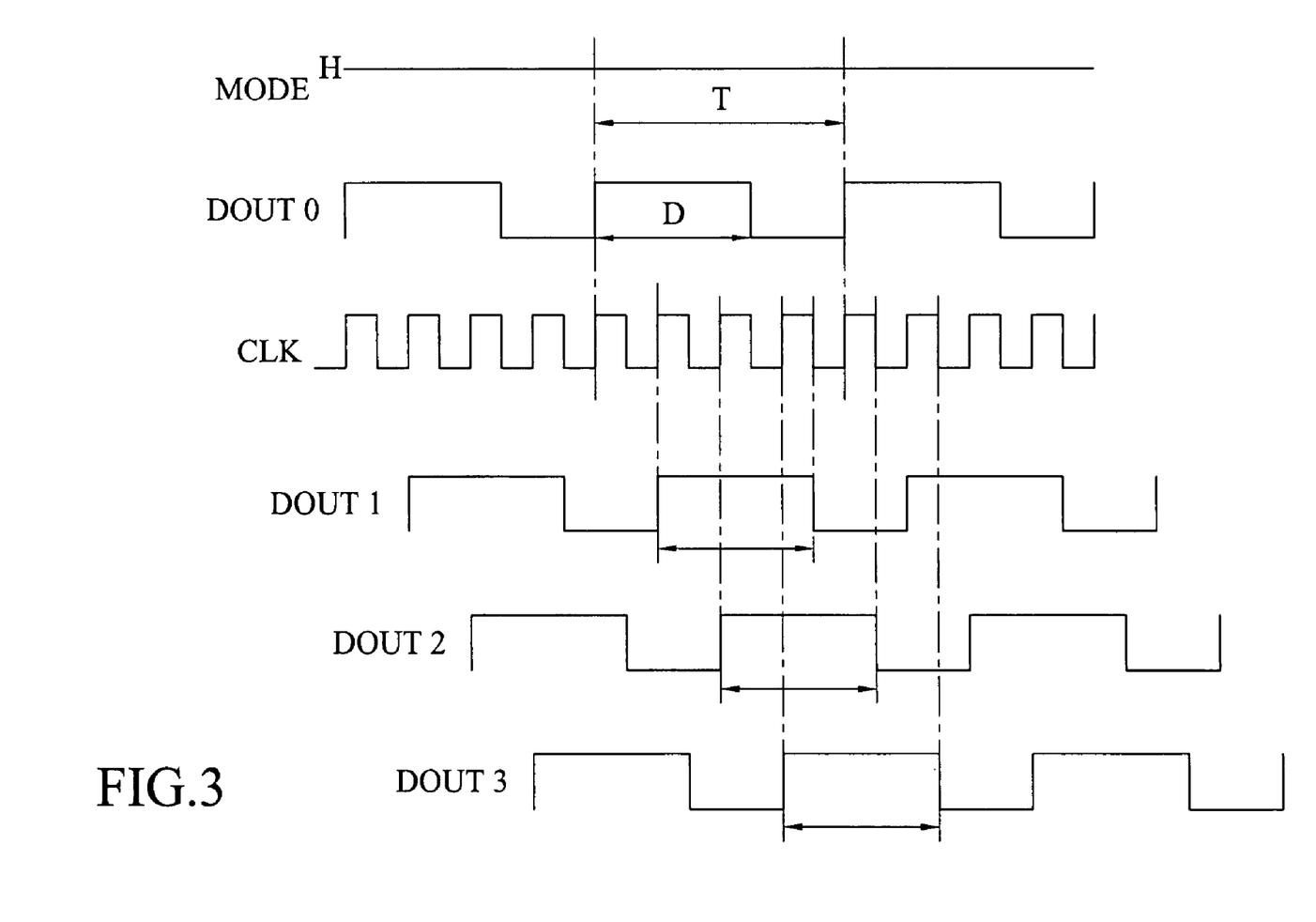
FIG. 3 is a trigger waveform of a cooperation circuit in FIG. 2.

FIG. 2 is a systematic diagram of a cooperation circuit according to another embodiment of the present invention and FIG. 3 is a trigger waveform of a cooperation circuit in FIG. 2. In the present embodiment, two third control modules are added to exemplify the present invention. That is, in addition to the first control module 2 and the second control module 3, a third control module 4 and a third control module 5 are connected in series to the second control module 3. It is preferable that the second control module 3, the third control module 4 and the third control module 5 are identical. Referring to FIG. 2 and FIG. 3, in addition to the first control module 2 and the second control module 3, the cooperation circuit 1 of the present invention further comprises a plurality of third control modules (for example, the third control module 4 and the third control module 5). The third control modules 4 and 5 and the second control module 3 all receive the first control signal CLK. The third control module 4 is coupled to the second control module 3 to receive the first control signal CLK and the third control signal DOUT1 so as to generate a present-stage control signal DOUT2. The third control module 5 is coupled to the previous-stage third control module 4 to receive the previous-stage control signal DOUT2 and the first control signal CLK so as to generate a present-stage control signal DOUT3. The second control module 3 causes a phase delay between the phase of the third control signal DOUT1 and the phase of the second control signal DOUT0 according to the first control signal CLK and the second control signal DOUT0. Each of the third control modules (for example, the third control module 4 and the third control module 5) causes a phase delay between the phase of the present-stage control signal and the phase of the previous-stage control signal according to the first control signal CLK and the previous-stage control signal. The second control signal DOUT0, the third control signal DOUT1, the control signal DOUT2 and the control signal DOUT3 are all at one state.

It is preferable that, according to the user's demand, the control signal DOUT3 from a last-stage control module is fed back to the first control module 2 to determine whether the circuit functions normally. It is preferable that the first control module 2 generates a fourth control signal MODE to determine the number of the control modules and to enable the second or the third control module. When the fourth control signal MODE is at one state for determining the number of the control modules and enabling the second control module 3 or the third control module, the first control module 2 only has to send a set of parameters (which can be included in the second control signal DOUT0) from the pin where the second control signal DOUT0 is sent and send the first control signal CLK of any frequency to trigger a next-stage control module (such as the second control module 3 or the third control module) to read and allow the set of parameters to pass through the third control modules. The first control module 2 can thus determine the number of the second control module 3 and third control module according to the fed back control signal DOUT3 and enable or disable the second control module 3 or the third control modules (such as the third control module 4 or the third control module 5) according to the set of parameters.

When the fourth control signal MODE is at another state, the second control module 3 causes a phase delay between the phase of the third control signal DOUT1 and the phase of the second control signal DOUT0 according to the first control signal CLK and the second control signal DOUT0. Each of the third control modules (such as the third control module 4 and the third control module 5) causes a phase delay between the phase of the present-stage control signal and the phase of the previous-stage control signal according to the first control signal CLK and the previous-stage control signal. Meanwhile, the first control signal CLK, the second control signal DOUT0 and the third control signal DOUT1 exhibit the respective frequency, the respective pulse width and the respective phase, which can be adjusted by the user according to practical demand. Also, the first control module 2 determines the number of the second control module 3 and the enabled third control modules (such as the third control module 4 and the third control module 5) according to the user's demand. The frequency and the pulse width can be calculated as previously described. Preferably, the frequency of the first control signal CLK equals to the frequency of the second control signal DOUT0 divided by the number of the first control module 2, the enabled second control module 3 and the enabled third control modules (such as the third control module 4 and third control module 5). The pulse width of the first control signal CLK preferably equals to the remainder of the pulse width of the second control signal DOUT0 divided by the cycle of the first control signal CLK. The trigger waveform for triggering the first control module 2, the second control module 3 and the third control modules (such as the third control module 4 and the third control module 5) is shown in FIG. 3. After the previous-stage control signal is rising edge triggered to be high, the present-stage control signal is high when the first control signal is rising edge triggered for a next time. After the previous-stage control signal is falling edge triggered to be low, the present-stage control signal is low when the first control signal is falling edge triggered for a next time. The duty cycle D is defined between the timing the present-stage control signal is rising edge triggered to be high and the timing the present-stage control signal is falling edge triggered to be low. Therefore, the control signal for each of the control modules can be obtained by the duty cycle D.

Figure 4:
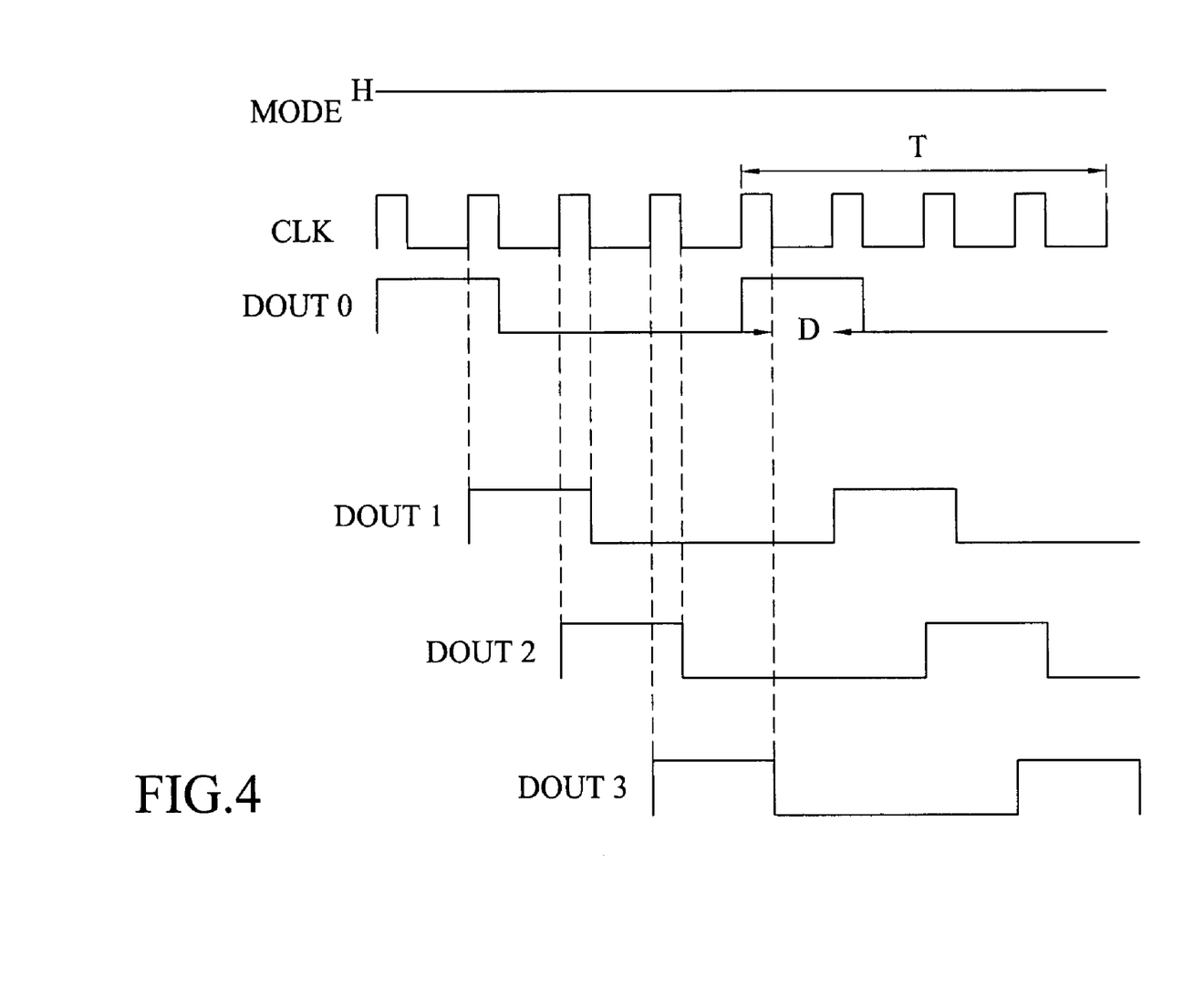
FIG. 4 is another trigger waveform of a cooperation circuit in FIG. 2.

FIG. 4 is another trigger waveform of a cooperation circuit in FIG. 2. Referring to FIG. 4 and FIG. 2. When the fourth control signal MODE is at another state, the second control module 3 causes a phase delay between the phase of the third control signal DOUT1 and the phase of the second control signal DOUT0 according to the first control signal CLK and the second control signal DOUT0. Each of the third control modules (such as the third control module 4 and the third control module 5) causes a phase delay between the phase of the present-stage control signal and the phase of the previous-stage control signal according to the first control signal CLK and the previous-stage control signal. Meanwhile, the first control signal CLK, the second control signal DOUT0 and the third control signal DOUT1 exhibit the respective frequency, the respective pulse width and the respective phase, which can be adjusted by the user according to practical demand. Also, the first control module 2 determines the number of the second control module 3 and the enabled third control modules (such as the third control module 4 and the third control module 5) according to the user's demand. The frequency and the pulse width can be calculated as previously described. Preferably, the frequency of the first control signal CLK equals to the pulse width of the second control signal DOUT0 divided by the number of the first control module 2, the enabled second control module 3 and the enabled third control modules (such as the third control module 4 and third control module 5). When the first control signal CLK is falling edge triggered and the previous-stage control signal is high, the present-stage control module control signal will be high when the first control signal CLK is rising edge triggered for a next time. When the first control signal CLK is rising edge triggered and the previous-stage control signal is low, the present-stage control module control signal will be low when the first control signal is falling edge triggered for a next time. The duty cycle D is defined between the timing the present-stage control signal is rising edge triggered to be high and the timing the present-stage control signal is falling edge triggered to be low. Therefore, the control signal for each of the control modules can be obtained by the duty cycle D.

From FIG. 3 and FIG. 4, it is observed that a phase delay is generated in both cases even though the trigger waveforms are not the same. Therefore, anyone with ordinary skill in the art can easily make modifications on the waveform to achieve a phase delay within the scope of the present invention.

Figure 5:
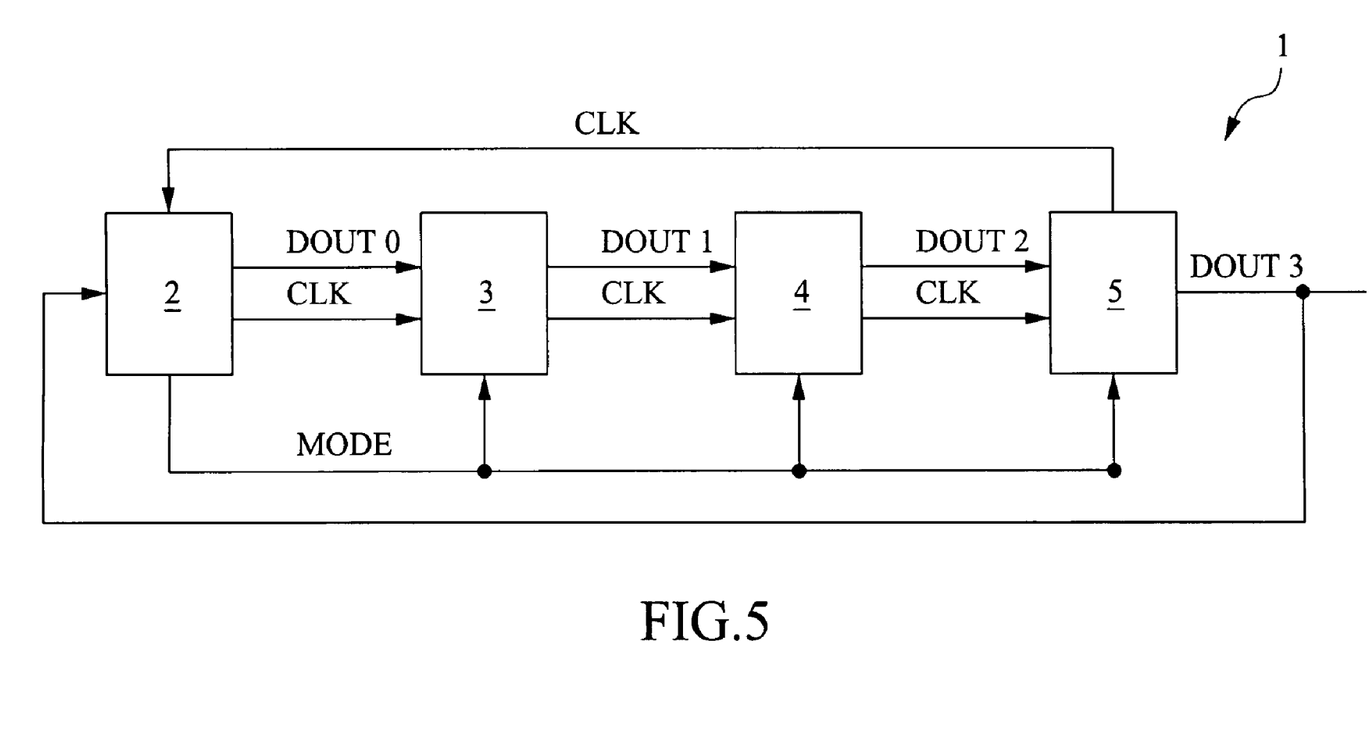
FIG. 5 is a systematic diagram of a cooperation circuit according to another embodiment of the present invention.

FIG. 5 is a systematic diagram of a cooperation circuit according to another embodiment of the present invention. Referring to FIG. 5, in addition to that the first control signal CLK is sent from the first control module 2 directly to each of the other control modules, the first control signal CLK can also pass through each of the control modules. In FIG. 5, the first-stage third control module (i.e., the third control module 4) is coupled to the second control module 3, while the other third control module (i.e., the third control module 5) is coupled to the previous-stage third control module (i.e., the third control module 4). The second control module 3 generates first control signal CLK sent to the first-stage third control module (i.e., the third control module 4) according to the first control signal CLK, while each of the other third control module (i.e., the third control module 5) generates the first control signal CLK sent to the next-stage third control module according to the first control signal CLK from the previous-stage third control module (i.e., the third control module 4). Each of the control modules generates the present-stage control signal according to the first control signal CLK and the third control signal generated by the previous-stage control module. Preferably, the first control signal generated last-stage control module (i.e., the third control module 5) is fed back to the first control module 2. Preferably, the second control module 3 and each of the third control modules (such as the third control module 4 and the third control module 5) comprise a buffer unit (not shown), such as a buffer circuit, to buffer or enhance the first control signal CLK. Therefore, the transmission delay of the first control signal CLK and the third control signals of each of the control modules can be adjusted to prevent erroneous judgment by the next-stage control module. The second control module 3 causes a phase delay between the phase of the third control signal DOUT1 and the phase of the second control signal DOUT0 according to the first control signal CLK and the second control signal DOUT0. Each of the third control modules (such as the third control module 4 and the third control module 5) causes a phase delay between the phase of the present-stage control signal and the phase of the previous-stage control signal according to the first control signal CLK passing through the previous-stage control module and the previous-stage control signal. The second control signal DOUT0, the third control signal DOUT1, the third control signal DOUT2 and third control signal DOUT3 are all at one state.

It is preferable that, according to the user's demand, the control signal DOUT3 of the last-stage control module is fed back to the first control module 2 to determine whether the circuit functions normally. It is preferable that the first control module 2 generates a fourth control signal MODE to determine the number of the control modules and to enable the second or the third control module. When the fourth control signal MODE is at one state for determining the number of the control modules and enabling the second control module 3 or the third control module, the first control module 2 only has to send a set of parameters (which can be included in the second control signal DOUT0) from the pin where the second control signal DOUT0 is sent and send the first control signal CLK of any frequency to trigger a next-stage control module (such as the second control module 3 or the third control module) to read and allow the set of parameters to pass through the third control modules. The first control module 2 can thus determine the number of the second control module 3 and third control module according to the fed back control signal DOUT3 and enable or disable the second control module 3 or the third control modules (such as the third control module 4 or the third control module 5) according to the set of parameters.

Meanwhile, the first control signal CLK, the second control signal DOUT0 and the third control signal DOUT1 exhibit the respective frequency, the respective pulse width and the respective phase, which can be adjusted by the user according to practical demand. When the fourth control signal MODE is at another state, the second control module 3 causes a phase delay between the phase of the third control signal DOUT1 and the phase of the second control signal DOUT0 according to the first control signal CLK and the second control signal DOUT0. Each of the third control modules (such as the third control module 4 and the third control module 5) causes a phase delay between the phase of the present-stage control signal and the phase of the previous-stage control signal according to the first control signal CLK passing through the previous-stage control module and the previous-stage control signal. The first control module 2 determines the number of the second control module 3 and the enabled third control modules (such as the third control module 4 and the third control module 5) according to the user's demand. The frequency and the pulse width can be calculated as previously described. Preferably, the frequency of the first control signal CLK equals to the frequency of the second control signal DOUT0 divided by the number of the first control module 2, the enabled second control module 3 and the enabled third control modules (such as the third control module 4 and third control module 5). As for the triggering of the control modules, please refer to related descriptions with reference to FIG. 3 and FIG. 4. In FIG. 5, even though the first control signal CLK is sent in a different manner compared to FIG. 2, a phase delay is generated as well. Therefore, anyone with ordinary skill in the art can easily understand that, by using the cooperation circuit of the present invention, any modification of the way the first control signal CLK is sent is still within the scope of the present invention.

Figure 6:
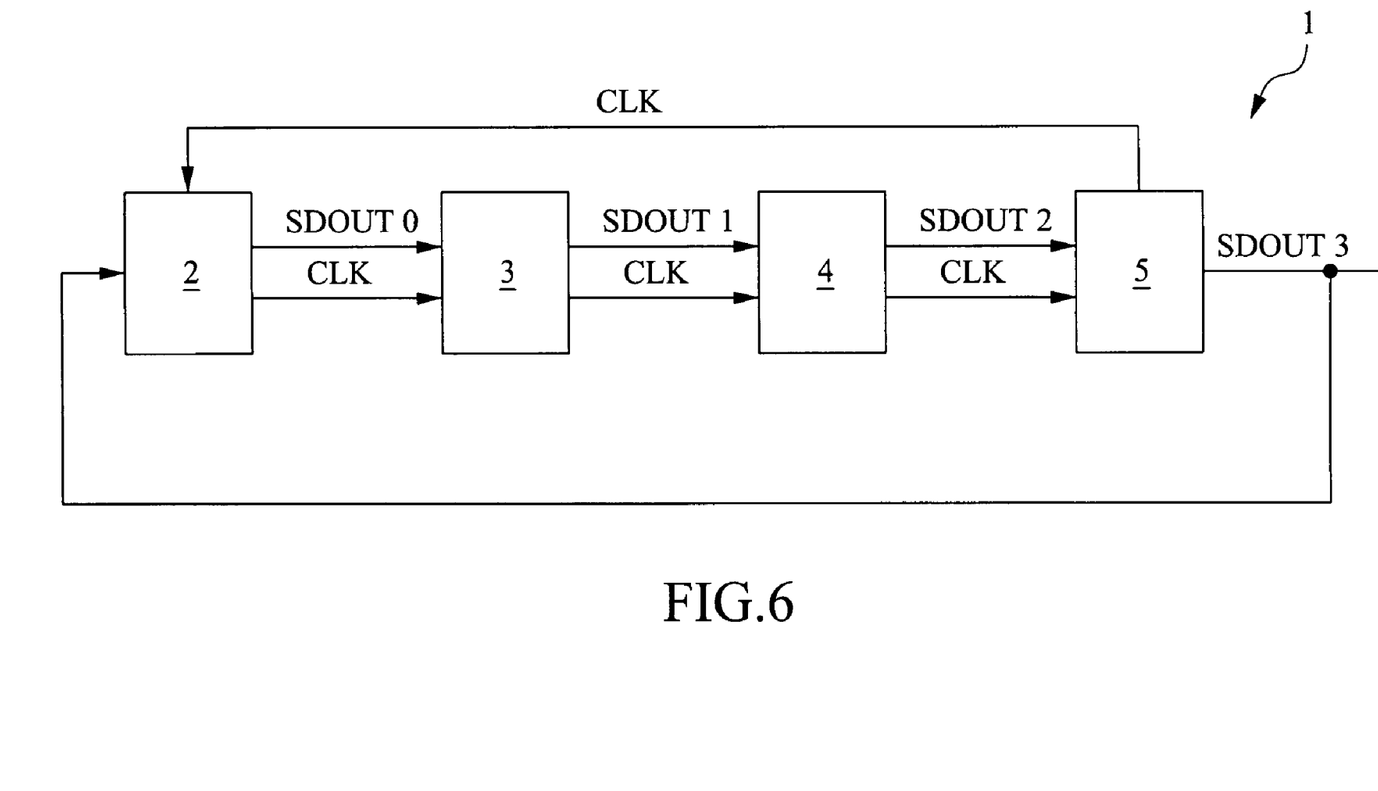
FIG. 6 is a systematic diagram of a cooperation circuit according to another embodiment of the present invention.

FIG. 6 is a systematic diagram of a cooperation circuit according to another embodiment of the present invention. Referring to FIG. 6 and FIG. 5, the cooperation circuit in FIG. 6 is similar to the cooperation circuit in FIG. 5 except that, in FIG. 6, the first control module 2 generates a first control signal CLK, a second control signal (not shown) and a fifth control signal SDOUT0. The fifth control signal SDOUT0 comprises information of the pulse width and the frequency of the second control signal. The frequency and the pulse width of the first control signal CLK is determined by the frequency and the pulse width of the second control signal. The second control module 3 receives the first control signal CLK and thereby triggers the second control module 3 so as to receive the fifth control signal SDOUT0 and generate a third control signal (not shown) and fifth control signal SDOUT1 to be sent to the next-stage control module 4. The fifth control signal SDOUT2 can be generated similarly when there are multiple stages. The fifth control signal SDOUT3 of the last-stage control module is fed back to the first control module 2. The second control signal and the third control signals are generated by the control modules without the fourth control signal MODE in the previous embodiment. Since the fifth control signals SDOUT0~SDOUT3 are digital control signals and the first control signal CLK triggers a next-stage control module to receive signals, the duty cycle D with a phase delay can be sent to a next-stage control module by modulating the first control signal CLK to be high/low as previously described. For example, the duty cycle $D=T_{CLK}*n+m$, wherein $T_{CLK}$ is the cycle of the first control signal CLK, "m" is the duration when the first control signal CLK is high/low, and E is the number of the enabled control modules. "n" and E are transmitted on the fifth control signal SDOUT0. The fifth control signal SDOUT0 transmits a header, for example, 111111111 according to the frequency of the first control signal CLK so that the next-stage control module can identify the signal for setting the duty cycle D. For example, when E=4 and n=3, 01000011 is transmitted, wherein the former four digits 0100 represent E=4, while the latter four digits 0011 represent n=3. As the next-stage control module receives the first control signal CLK and the first control signal CLK rising edge triggers the fifth control signal SDOUT0, it is determined that the duty cycle D of the present-stage control module lags behind the second control signal by a cycle of the first control signal CLK and holds for three cycles of the first control signal CLK before it ends at a fourth falling edge of the first control signal CLK (taking four control modules for example). A next duty cycle D begins at a next rising edge, where $D=T_{CLK}*n+m$, with a constant phase delay of a cycle of the first control signal CLK. The second control module keeps the fifth control signal SDOUT1 and the fifth control signal SDOUT0 with a phase delay of a cycle of the first control signal CLK, and transmits the content therein to the next-stage control module. The other control signals can be transmitted similarly. The duty cycle is updated when each stage of the control modules receives an updated signal for setting the duty cycle so that the duty cycle with a phase delay is transmitted to a next-stage control module. Thereby, the setting of digital data, such as the coding of the header or the content, can be realized to achieve the same object by various ways within the scope of the present invention. Therefore, anyone with ordinary skill in the art can make modifications on the setting/coding of the fifth control signals SDOUT0~SDOUT3 to achieve the phase delay by using the cooperation circuit of the present invention.

In the previous embodiments, examples are provided only to exemplify, but not to limit, the present invention. The circuit diagrams, trigger waveforms, phase delays between the first control signal and various control signals can be equivalently modified by the user to achieve various purposes according to the user's demand.

Accordingly, the present invention provides a cooperation circuit capable of achieving low power consumption, low EMI and identical PWM frequency. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A cooperation circuit, comprising:
    a first control module, capable of generating a first control signal and a second control signal, the frequency and the pulse width of the first control signal being determined by the frequency and the pulse width of the second control signal; and
    a second control module, coupled to the first control module to receive the first control signal and the second control signal and generate a third control signal according to the first control signal and the second control signal;
    wherein the frequency of the first control signal equals the frequency of the second control signal multiplied by the number of enabled cooperated control modules, and the pulse width of the first control signal equals to the remainder of the pulse width of the second control signal divided by the cycle of the first control signal;
    wherein the second control module causes a phase delay between the phase of the third control signal and the phase of the second control signal according to the first control signal and the second control signal.

2. The cooperation circuit as recited in claim 1, further comprising:
    a plurality of third control modules, capable of receiving the first control signal,
    wherein a first-stage third control module is coupled to the second control module to receive the first control signal and the third control signal so as to generate a present-stage third control signal of the first-stage third control module;
    wherein subsequent third control modules are coupled in series to the first-stage third control module, and each subsequent third control module becomes a present-stage third control module in sequence as present-stage third control signals are generated by a previous third control module;
    wherein the present-stage third control module receives the present-stage third control signal from the previous third control module and the first control signal and generates a new present-stage third control signal;
    wherein each subsequent third control module causes a phase delay between the phase of the present-stage third control signal and the phase of the present-stage third control signal generated by the previous third control module according to the first control signal and the third control signal generated by the previous third control module.

3. The cooperation circuit as recited in claim 2, wherein a last-stage control signal of a last-stage third control module is fed back to the first control module generating a fourth control signal, the second control module causing a phase delay between the phase of the third control signal and the phase of the second control signal according to the first control signal and the second control signal and the third control modules causing a phase delay between the phase of a present-stage control signal and the phase of a previous-stage control signal according to the first control signal and the previous-stage control signal when the fourth control signal is at one state, while the first control signal, the second control signal and the third control signal exhibiting the respective frequency, the respective pulse width and the respective phase so that the first control module sends the first control signal to the second control module to further pass through each of the third control modules and determines the number of enabled second and third control modules according to the last-stage control signal fed back to the first control module when the fourth control signal is at another state.

4. The cooperation circuit as recited in claim 2, wherein each of the third control signals is high when the first control signal is rising edge triggered for a next time after the second control signal is rising edge triggered, while each of the third control signals is high when the first control signal is falling edge triggered for a next time after the second control signal is falling edge triggered.

5. The cooperation circuit as recited in claim 2, wherein the third control signal of the present-stage control module is high when the first control signal is rising edge triggered for a next time if the first control signal is falling edge triggered and the present-stage third control signal from the previous third control module is high, while the third control signal of the present-stage control module is low when the first control signal is falling edge triggered for a next time if the first control signal is rising edge triggered and the present-stage third control signal from the previous third control module is low.

6. The cooperation circuit as recited in claim 1, further comprising:
a plurality of third control modules,
wherein a first-stage third control module is coupled to the second control module, while the other third control modules are coupled to a previous-stage third control module,
wherein the second control module generates the first control signal sent to the first-stage third control module according to the first control signal, while each of the other third control modules generates the first control signal sent to a next-stage third control module according to the first control signal of the previous-stage third control module,
wherein each of the control modules generates a present-stage first control signal and the present-stage third control signal according to the first control signal and the third control signal generated by a previous-stage control module,
wherein the second control module causes a phase delay between the phase of the third control signal and the phase of the second control signal according to the first control signal and the second control signal,
wherein each of the third control modules causes a phase delay between the phase of a present-stage third control signal and the phase of a previous-stage third control signal according to the first control signal and the previous-stage control signal generated by the previous-stage third control module.

7. The cooperation circuit as recited in claim 6, wherein the first control signal and the third control signal of a last-stage third control module are fed back to the first control module generating a fourth control signal, the second control module causing a phase delay between the phase of the third control signal and the phase of the second control signal according to the first control signal and the second control signal and the third control modules causing a phase delay between the phase of the present-stage third control signal and the phase of the previous-stage third control signal according to the first control signal passing through the previous-stage third control module and the previous-stage third control signal when the fourth control signal is at one state, while the first control signal, the second control signal and the third control signal exhibiting the respective frequency, the respective pulse width and the respective phase so that the first control module sends the first control signal to the second control module to further pass through each of the third control modules and determines the number of enabled second and third control modules according to the third control signal fed back from the last-stage third control module to the first control module when the fourth control signal is at another state.

8. The cooperation circuit as recited in claim 6, wherein each of the third control signals is high when the first control signal is rising edge triggered for a next time after the second control signal is rising edge triggered, while each of the third control signals is high when the first control signal is falling edge triggered for a next time after the second control signal is falling edge triggered.

9. The cooperation circuit as recited in claim 6, wherein the third control signal of the present-stage control module is high when the first control signal is rising edge triggered for a next time if the first control signal is falling edge triggered and the present-stage third control signal from the previous third control module is high, while the third control signal of the present-stage control module is low when the first control signal is falling edge triggered for a next time if the first control signal is rising edge triggered and the the present-stage third control signal from the previous third control module is low.

10. The cooperation circuit as recited in claim 1, wherein the third control signal is fed back to the first control module generating a fourth control signal, the second control module causing a phase delay between the phase of the third control signal and the phase of the second control signal according to the first control signal and the second control signal when the fourth control signal is at one state, while the first control signal, the second control signal and the third control signal exhibiting the respective frequency, the respective pulse width and the respective phase so that the first control module sends the first control signal and the second control signal to the second control module and determines the number of enabled second control modules according to the third control signal fed back from the second control module to the first control module when the fourth control signal is at another state.

11. The cooperation circuit as recited in claim 1, wherein the third control signal is high when the first control signal is rising edge triggered for a next time after the second control signal is rising edge triggered, while the third control signal is high when the first control signal is falling edge triggered for a next time after the second control signal is falling edge triggered.

12. The cooperation circuit as recited in claim 1, wherein the third control signal is high when the first control signal is rising edge triggered for a next time if the first control signal is falling edge triggered and the second control signal is high, while the third control signal is low when the first control signal is falling edge triggered for a next time if the first control signal is rising edge triggered and the second control signal is low.

13. A cooperation circuit, comprising:
- a first control module, capable of generating a first control signal, a second control signal and a fifth control signal comprising information of the pulse width and the frequency of the second control signal, the frequency and the pulse width of the first control signal being determined by the frequency and the pulse width of the second control signal; and
- a second control module, coupled to the first control module to receive the first control signal and the fifth control signal after the first control signal has triggered the second control module, and generate a third control signal and the fifth control signal of a next-stage control module and;
- wherein the second control module causes a phase delay between the phase of the third control signal and the phase of the second control signal according to the first control signal and the second control signal.

14. The cooperation circuit as recited in claim 13, further comprising:
- a plurality of third control modules, capable of receiving the first control signal,
- wherein a first-stage third control module is coupled to the second control module to receive the first control signal and the fifth control signal so as to generate the third control signal and the fifth control signal of a present-stage control module,
- wherein the fifth control signal of the present-stage control module comprises information of the pulse width and the frequency of the third control signal,
- wherein the other third control modules are coupled to a previous-stage third control module to receive the fifth control signal and the first control signal from the previous-stage third control module to generate the third control signal and the fifth control signal of present-stage third control module,
- wherein the second control module causes a phase delay between the phase of the third control signal and the phase of the second control signal according to the first control signal and the second control signal,
- wherein each of the third control modules causes a phase delay between the phase of the present-stage third control signal and the phase of the previous-stage third control signal according to the first control signal and the previous-stage third control signal.

* * * * *